United States Patent [19]

Evans

[11] 4,240,695

[45] Dec. 23, 1980

[54] OPTICAL FIBERS CONNECTOR

[75] Inventor: Robert F. Evans, Newbury Park, Calif.

[73] Assignee: E. I. Du Pont de Nemours and Company, Wilmington, Del.

[21] Appl. No.: 50,426

[22] Filed: Jun. 20, 1979

Related U.S. Application Data

[63] Continuation-in-part of Ser. No. 758,323, Jan. 10, 1977, abandoned.

[51] Int. Cl.³ .............................................. G02B 5/14
[52] U.S. Cl. ................................ 350/96.21; 350/96.20
[58] Field of Search ................ 350/96.20, 96.21, 96.22

[56] References Cited

U.S. PATENT DOCUMENTS

| 3,861,781 | 1/1975 | Hasegawa et al. | 350/96.21 |
| 3,947,182 | 3/1976 | McCartney | 350/96.21 |
| 4,076,376 | 2/1978 | Slaughter | 350/96.20 |

FOREIGN PATENT DOCUMENTS 2237445  2/1974  Fed. Rep. of Germany ........ 350/96.21

*Primary Examiner*—Stewart J. Levy

[57] ABSTRACT

An end-to-end connector for optical fibers. A plastic body has opposed sockets leading to an interconnecting bore. The sockets receive terminals in which the fibers to be connected are aligned and gripped.

4 Claims, 10 Drawing Figures

U.S. Patent Dec. 23, 1980 Sheet 1 of 4 4,240,695
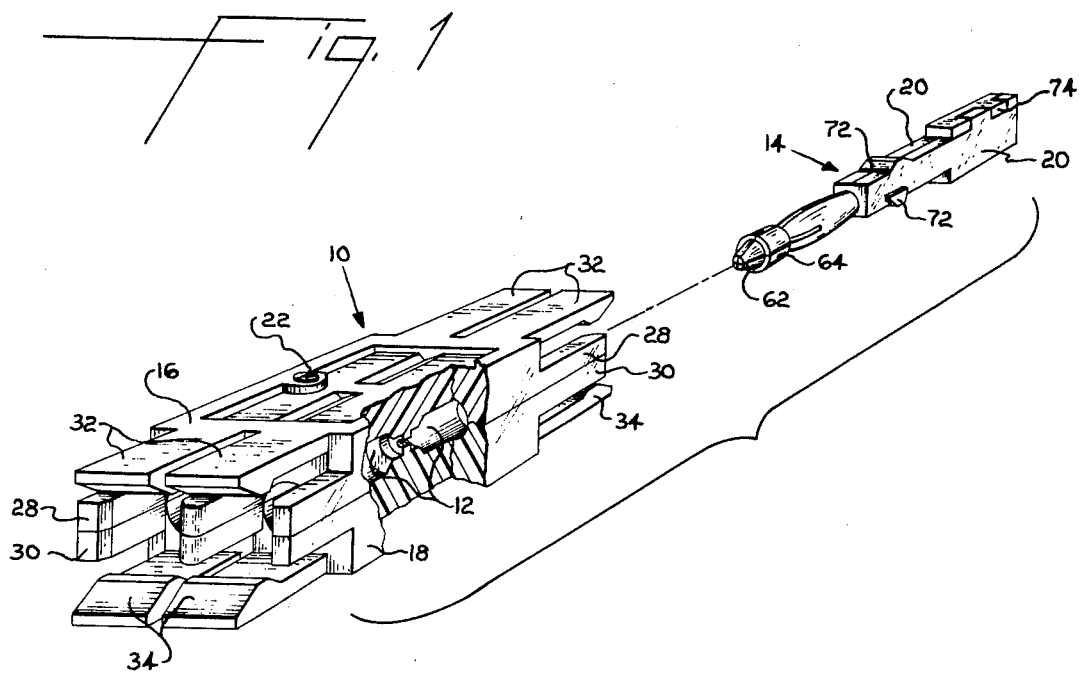
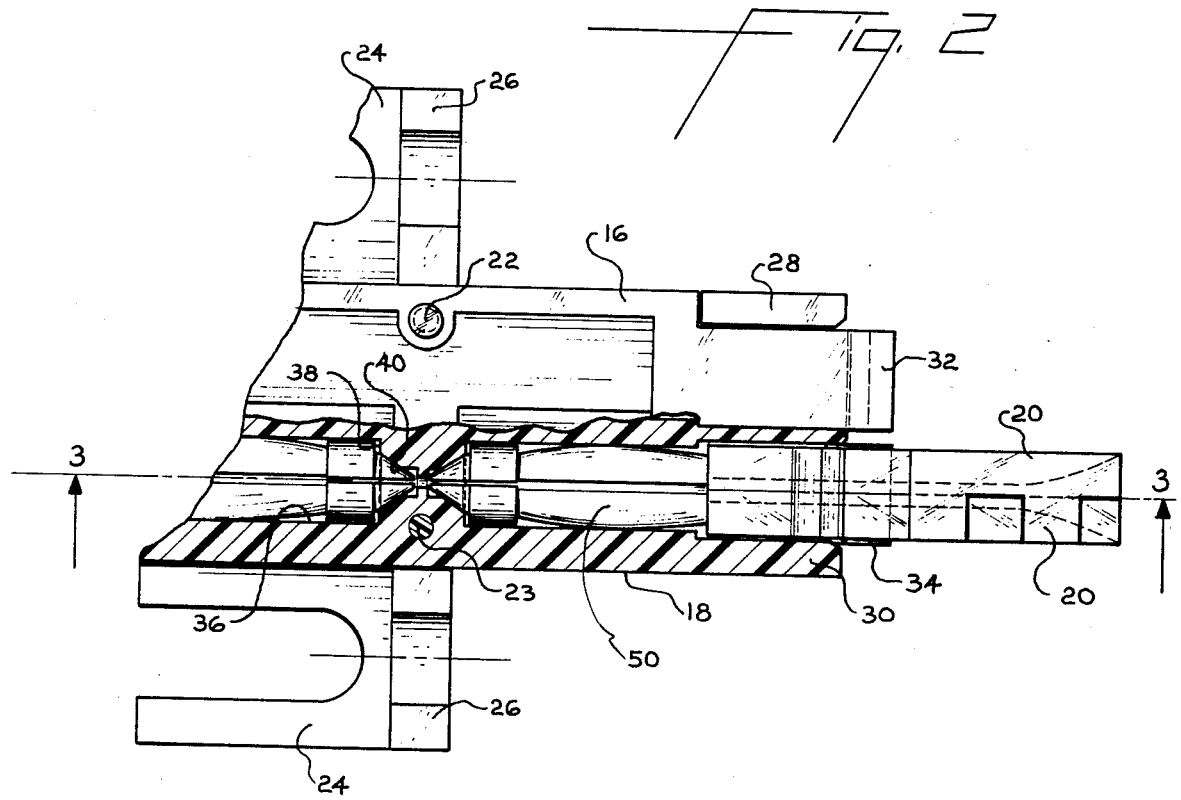

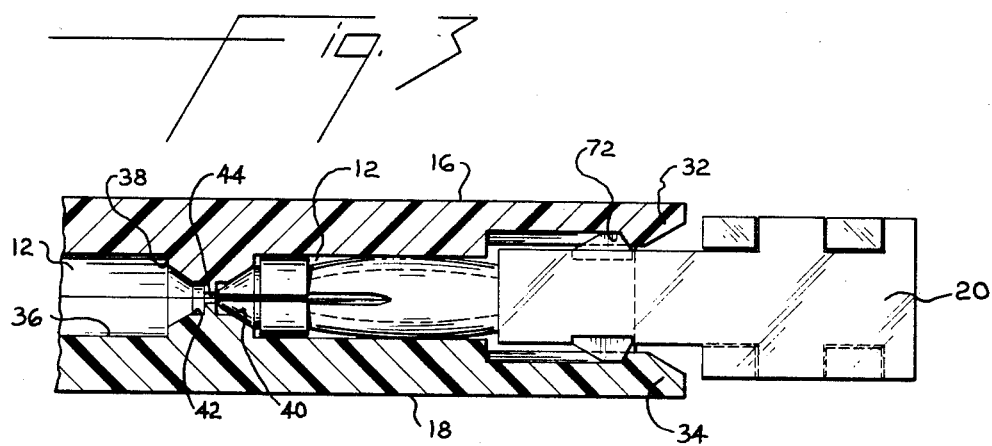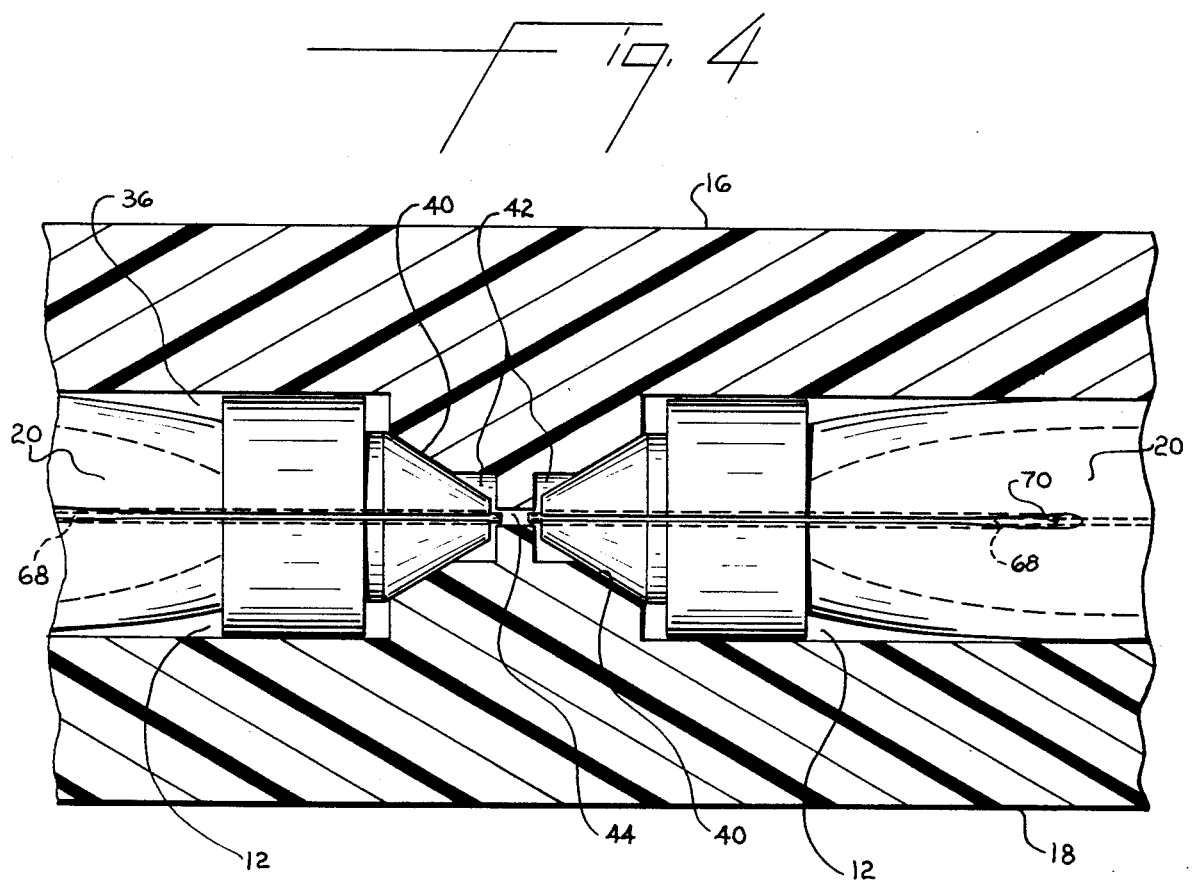

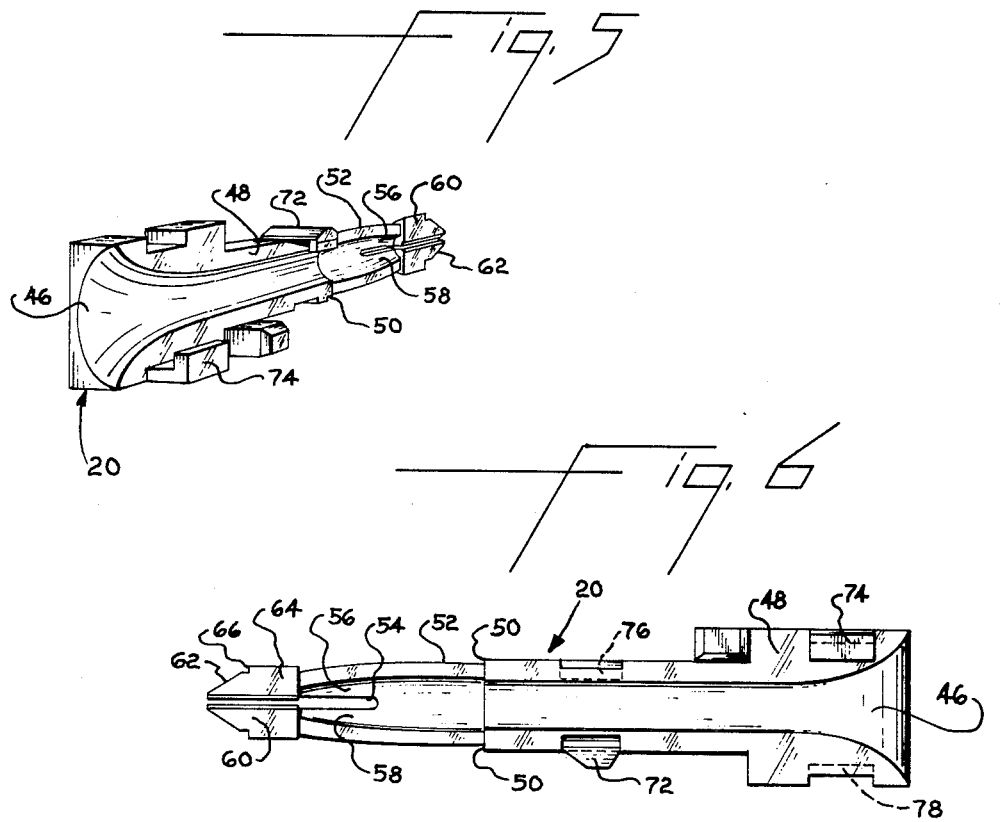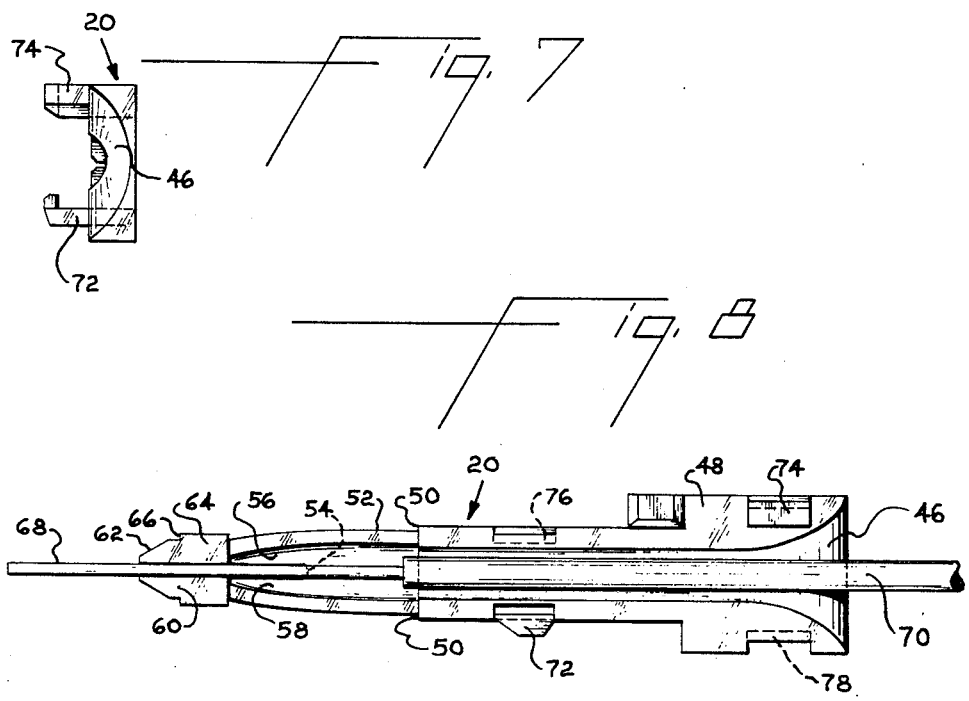

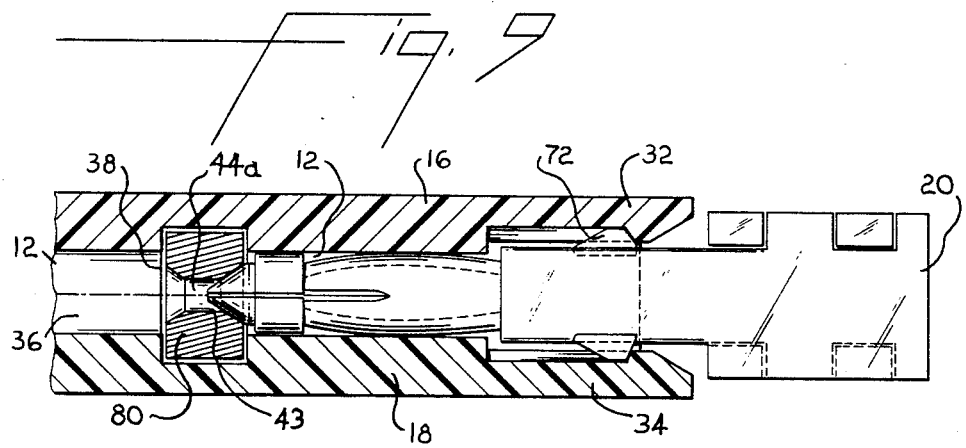
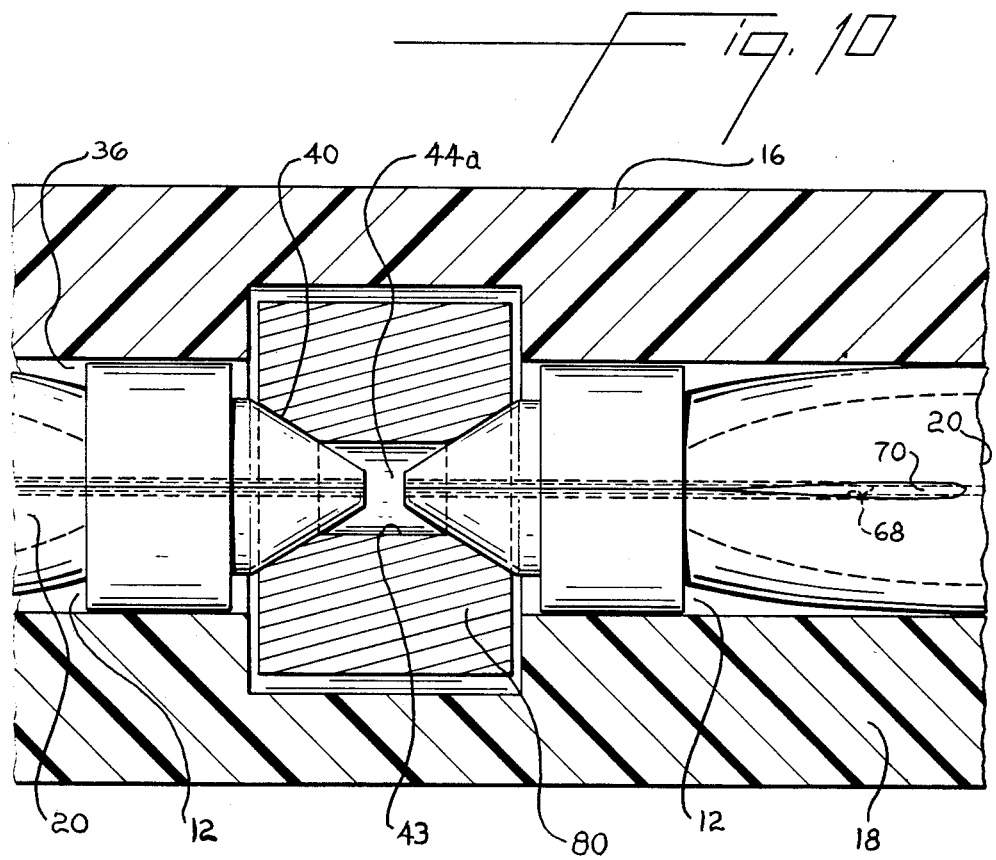

OPTICAL FIBERS CONNECTOR

This application is a continuation-in-part of my application Ser. No. 758,323, filed Jan. 19, 1977 now abandoned.

BACKGROUND

This invention relates generally to the transmission of light from the output of one optical device to the input of another and, more particularly, to the coupling of fibers in the path of transmission.

An optical fibers connector with flared sockets leading to a bore has been disclosed by Martin in U.S. Pat. No. 3,948,582. The flared sockets receive conical plugs from which fibers extend into abutting relationship in the bore. Each plug has a bore through which a fiber is threaded. Then, the fiber must be cemented in place. In addition to the difficulties inherent in cementing the fiber, the probabilities of achieving alignment in the plug and avoiding damage to the fiber are low.

SUMMARY

The connector disclosed and claimed herein includes a body having opposed aligned sockets leading to an interconnecting bore and a pair of elongated terminals that fit into the sockets. Each terminal has a through passage and is split into spaced fingers at one end. The fingers terminate in jaws that align an optical fiber extending into and through the passage. Each fiber extends flush with the tip of the ends of the jaws. There are latches on the body and terminals for holding the terminals in the sockets with the fiber ends in the ends of the bore.

DESCRIPTION OF THE DRAWINGS

Worthwhile objectives and advantages of the connector will be apparent from the following specification wherein reference is made to the accompanying drawings in which:

FIG. 1 is an enlarged exploded perspective illustration of the connector body and one terminal;

FIG. 2 is a fragmentary plan view of the connector shown in FIG. 1, parts having been broken away and shown in section to reveal details of construction;

FIG. 3 is a fragmentary sectional view taken on line 3—3 in FIG. 2, except that only one terminal appears and it is shown in its entirety;

FIG. 4 is a fragmentary enlarged sectional view of the connector, taken on line 3—3 in FIG. 2, and shows the location of optical fibers in the assembled connector;

FIGS. 5 and 6 are perspective and side views, respectively, of one channel member from the terminal of FIGS. 1-4;

FIG. 7 is an end view of the channel member shown in FIGS. 5 and 6; and

FIG. 8 is a side view of a channel member with an optical fiber shown as it is located during assembly of a terminal.

FIG. 9 is a fragmentary sectional view similar to that of FIG. 3, with the addition of an alignment collar connecting fibers in opposed pairs of terminals.

FIG. 10 is a fragmentary enlarged sectional view of the connector similar to FIG. 4, with the addition of an alignment collar.

DESCRIPTION OF PREFERRED EMBODIMENT

The fiber optics connector chosen for purposes of illustration includes a body 10 having opposed pairs of sockets 12, each adapted to receive and seat a terminal 14. Body 10 is assembled from mating sections 16, 18 and each terminal 14 from a pair of identical channel members 20. Sections 16 and 18 have integral pins 22 that press fit in complemental holes 23. Sections 16 and 18 have horizontal and vertical mounting flanges 24, 26. At each end of body 10, two pairs of fingers 28, 30 and opposed pairs of latches 32, 34 define rectangular entries to the sockets 12.

Body 10 and terminals 14 have been molded from a polyester and nylon 6/6, respectively. Other plastics are suitable, e.g., polycarbonate, acrylonitrile-butadiene-styrene (ABS), phenylene oxide, polyether sulfones and mixtures of ABS with a polycarbonate. The plastic from which the terminals are molded can be reinforced, e.g., with glass fibers.

Referring to FIG. 3, each socket 12 includes an elongated passage 36 that is circular in cross section. Passage 36 extends to a step 38 from which socket 12 continues inwardly through a conically tapered seat 40 and a counterbore 42 of circular cross section to another counterbore 44 which is referred to herein as a bore that interconnects a pair of opposed, aligned sockets 12.

As shown in FIGS. 5-7, each channel member 20 has a flared channel 46 on its inner surface 48. Intermediate its ends, at a shoulder 50, the outside geometry of the channel member changes from rectilinear surfaces to a rounded exterior in a length 52. Length 52 is adapted for insertion into a socket 12 and has its free end split at 54 into flexible fingers 56, 58. At the end of each finger, there is a jaw 60 with a tapered outer surface 62 and an enlarged segment 64 having a cylindrical exterior. Surfaces 62, 64 are separated by a step 66.

In the termination of an optical fiber, a channel member 20 is located in a fixture. Then, an optical fiber 68 with the polymeric jacket 70 stripped from its end is placed on the channel member, as shown in FIG. 8, with the stripped end extending to the tip of the squared ends of jaws 60 and with the jacket 70 resting in channel 46. Next, a second channel member 20 having a complemental mating surface 48 is mated with and latched to the first. In the latter respect, each channel member 20 has a central latch 72 and an end latch 74. Each latch 72 catches in a complemental recess 76 and each latch 74 in a complemental recess 78 on the mated channel member 20. With the channel members so latched, the jacketed fiber is gripped in channels 46. As best shown in FIGS. 7 and 8, channels 46 are dish shaped and preferably have a series of ribs etched in the plastic to aid gripping of the fibers. Their width adjacent shoulder 50 is greater than the diameter of a jacketed fiber and their depth slightly less than half the diameter of a jacketed fiber. This relationship makes it easier to place and grip the jacket during assembly.

With the channel members latched and held, the stripped end is cut in close proximity to the squared ends of the jaws 60 (FIG. 4). Channels 46 can, of course, be dimensioned to grip the unjacketed end of a fiber. In a preferred embodiment a soft pad is inserted within channel 46 to prevent movement of the fiber in the channel. The degree of flex in fingers 56, 58 is a design feature that can be varied to provide a loose fit or light pressure on a fiber 68 as channel members 20 are latched. Thus, with the split terminals disclosed herein, the stripped ends of optical fibers can be terminated accurately without being threaded through small passages or otherwise exposed to abrasive contacts that frequently lead to scratches or fractures. The possibility of scratches and fractures is further minimized by not having to cut the end of the fiber until after its termiation and by cutting the relatively stiff length at the ends of the jaws.

When a terminal is inserted, rotational alignment is maintained by the fit of the rectilinear length to the rear of shoulders 50 in the rectangular entries defined by fingers 28, 30 and latches 32, 34 on sections 16, 18 of body 10. Referring to FIGS. 3 and 6, each latch 72 has a gradually sloped leading edge and a sharply sloped trailing edge. Upon insertion, the leading edges of latches 72 cam latches 32, 34 and the latter catch on the trailing edges. As shown in FIG. 3, the catch surfaces on latches 32, 34 are disposed for engagement with the trailing edges on latches 72. In the event axial forces are applied to a cable, the cooperating edges on the latches permit a terminal to eject itself before the applied force reaches the breaking strength of the cable. The cable can be moved with respect to inserted terminals without breakage because of the flared ends in channels 46. In this respect, the maximum extent of flare in the channels is less than the angle of bend at which the fibers break.

As the terminal is inserted, the interrupted cylindrical surface presented by spaced segments 64 aligns the terminal with respect to the socket 12 and bore 44. The tapered surfaces 62 on jaws 60 engage seat 40 and move together to align fiber 68 with bore 44. By design, bore 44 should have a somewhat larger diameter than the fiber 68. With the terminal already in alignment with socket 12 and bore 44, the engagement of surfaces 62 with seat 40 insures alignment of the fiber end in jaws 60 and, therefore, with the bore 44. Thus, the ends of the fibers do not touch body 10 and, accordingly, are not damaged. When another terminal 14 has been inserted in the opposed socket 12, the spaced ends of two fibers are aligned and light can be transmitted effectively from one to the other through bore 44.

The gap between the two fibers should not exceed the diameter of a stripped fiber end. As a minimum, the ends of the fibers should not contact each other. If the fiber ends are closely spaced, an acceptable level of light loss can be achieved with as-molded parts. As the gap is increased, the rate at which light loss increases is reduced by augmenting reflectivity in the bore, e.g., by polishing the molded bore or by depositing aluminum on the surface of the bore by cathode sputtering. Other coating materials such as gold and multi-layer dielectric films are suitable. Other deposition techniques include vacuum evaporation and chemical vapor deposition.

In a most preferred connector of this invention, as shown in FIGS. 9 and 10, an alignment collar 80 receives the ends of the optical fiber 68 in the tapered seat 40 within the bore 44a. Surface 43 defines the edge of this bore. The tapered conical seat 40 from each terminal 14 opposedly meet within the bore 44a.

This alignment collar can be made from any corrosive resisting metal and is inserted into the mid-point of the connector prior to the engagement of sections 16 and 18.

The alignment collar acts to preserve alignment of the opposing seats 40 during bonding of sections 16 and 18.

The connector shown in FIG. 1 has two pairs of aligned sockets 12. As such, it is particularly suitable for use in coupling reinforced and jacketed cables of two jacketed fibers. Such a cable is available from the assignee hereof and has been indentified as PFX-P24OR. The cable contains two plastic optical fibers, each of which consists of a polymethyl methacrylate core in a polymeric cladding of lower refractive index. Jackets on the individual fibers and on the cable are of a flame retarded polyester elastomer. The connector is, of course, adapted to couple uncabled fibers and fibers of other compositions, e.g., pure silica, doped silica, glass or a polystyrene core clad with an acrylic.

I claim:

1. A connector for optical fibers, said connector comprising:
    a body having opposed aligned sockets leading to an interconnecting bore, each socket having a tapered seat adjacent the bore;
    a pair of terminals, each terminal comprising a pair of elongated channel members having complementary mating surfaces, each channel member being split into fingers at one end, said fingers terminating in jaws adapted to contact and align the stripped end of an optical fiber otherwise extending through but not in contact with said members, said jaws having tapered outer surfaces, there being a terminal in each socket; and
    inter-engaging latch means on said terminals and the body for holding terminals in said sockets with the tapered surfaces engaging said seats.

2. The connector of claim 1, each socket having a counterbore between its conical seat and said bore, the fingers on each terminal having squared ends within a counterbore.

3. The connector of claim 1, said jaws having segments of increased radial extent adjacent said tapered outer surfaces, said segments presenting an interrupted cylindrical surface adapted to slidably engage the body within a socket as each terminal is inserted.

4. The connector of claim 1 wherein the ends of said tapered seat of each socket are opposedly aligned within an alignment collar.

* * * * *